US008366376B2

(12) United States Patent
Herrmann

(10) Patent No.: US 8,366,376 B2
(45) Date of Patent: Feb. 5, 2013

(54) MULTIPLE ARTICULATING ELEVATOR AND STACKER SUPPORT SYSTEM

(75) Inventor: Douglas K. Herrmann, Webster, NY (US)

(73) Assignee: Xerox Corporation, Norwalk, CT (US)

(*) Notice: Subject to any disclaimer, the term of this patent is extended or adjusted under 35 U.S.C. 154(b) by 406 days.

(21) Appl. No.: 12/481,121

(22) Filed: Jun. 9, 2009

(65) Prior Publication Data

US 2010/0310350 A1 Dec. 9, 2010

(51) Int. Cl.
*B65H 33/00* (2006.01)
*B65H 33/16* (2006.01)
*B65G 1/12* (2006.01)
*G07F 11/06* (2006.01)

(52) U.S. Cl. .................. 414/790.8; 414/794.1; 414/924; 271/218; 198/465.3

(58) Field of Classification Search .................... 108/94; 198/626.1, 626.2, 817; 221/77, 84; 271/214–215, 271/218; 414/331.04, 331.08, 618, 664, 414/785, 790, 790.2, 790.4, 790.9, 791, 791.6, 414/793.4–793.9, 794, 794.1, 794.2, 794.5, 414/794.6, 799, 923–924; 194/626.1, 626.2, 194/817
See application file for complete search history.

(56) References Cited

U.S. PATENT DOCUMENTS 1,876,510 A * 9/1932 Morrison ........................ 312/97
2,010,732 A * 8/1935 Mandusic .................. 414/793.7
2,574,045 A * 11/1951 Lapham ........................ 414/642
3,287,074 A * 11/1966 Crossley ......................... 312/97
3,303,921 A * 2/1967 Gore ............................. 198/802
3,381,830 A * 5/1968 Vasse ......................... 414/790.4
3,526,170 A * 9/1970 Wiseman et al. .......... 414/790.4
3,616,965 A * 11/1971 Bendl ............................. 221/84
4,678,387 A * 7/1987 Sjogren et al. ............ 414/790.4
5,018,618 A * 5/1991 Sjogren ...................... 198/347.3
5,141,128 A * 8/1992 Pippin ............................. 221/84
5,390,907 A * 2/1995 Dole ............................. 271/214
5,611,422 A * 3/1997 Harkonen ..................... 198/681
5,857,829 A * 1/1999 Achelpohl ................. 414/797.3
6,241,458 B1 * 6/2001 Berndl ....................... 414/790.3
6,481,952 B2 11/2002 Deutschle
2005/0269765 A1 * 12/2005 Widmer et al. ............... 271/190
2006/0127204 A1 * 6/2006 Hanaoka .................. 414/331.01
2008/0095604 A1 * 4/2008 Jeon ........................... 414/794.5

FOREIGN PATENT DOCUMENTS

EP 96398 A1 * 12/1983

OTHER PUBLICATIONS

Parent U.S. Appl. No. 11/272,128.

* cited by examiner

*Primary Examiner* — Gregory Adams
(74) *Attorney, Agent, or Firm* — Ronald E. Prass, Jr.; Prass LLP

(57) ABSTRACT

This is a paper-stacking support with segmented shelves that can support paper and can also fold upon being rotated around rollers by a driver belt. Once an upper shelf is fully loaded, it is moved downwardly by the drive belt and another shelf is moved into an upper loading position by the drive belt. This allows for a continuous running of the stacking operation without an interruption during the unloading of the stacked paper.

19 Claims, 5 Drawing Sheets

MULTIPLE ARTICULATING ELEVATOR AND STACKER SUPPORT SYSTEM

This invention relates to a paper collection system and more specifically to paper stackers used in paper marking systems.

BACKGROUND

While the present invention can be effectively used in a plurality of paper-handling or marking systems, it will be described for clarity as used in finisher modules of electrostatic marking systems such as electrophotography. In an electrostatographic reproducing apparatus commonly used today, a photoconductive insulating member may be charged to a negative potential, thereafter exposed to a light image of an original document to be reproduced. The exposure discharges the photoconductive insulating surface in exposed or background areas and creates an electrostatic latent image on the member which corresponds to the image areas contained within the original document. Subsequently, the electrostatic latent image on the photoconductive insulating surface is made visible by developing the image with a developing powder referred to in the art as toner. During development, the toner particles are attracted from the carrier particles by the charge pattern of the image areas on the photoconductive insulating area to form a powder image on the photoconductive area. This image may be subsequently transferred or marked onto a support surface, such as copy paper to which it may be permanently affixed by heating or by the application of pressure. Following transfer of the toner image or marking, the copy paper may be removed from the system by a user or may be automatically forwarded to a finishing station where the copies may be collected, compiled, stapled and formed into books, pamphlets, or other sets. This invention will be described throughout in reference to paper collected after the finishing station processes are completed. It should be understood, however, that the present invention can be used in any systems where paper is collected in paper stacks.

As above noted, there are many marking systems that transport paper or other media after the paper is marked in marking step or steps. These marking systems could include electrostatic marking systems, non-electrostatic marking systems and printers or any other system where paper or other flexible media or receiving sheets are transported internally to an output device, such as a finisher and compiler station or stations and the subsequent stacking of paper after the compiler completes its functions.

These electrostatic marking systems have finisher and compilers located at a site after the receiving sheets (paper) have been marked with a toner. After finishing is completed, the paper is conveyed to a paper-stacking or collection device generally conveniently located at a bottom portion of the finisher module of a marking machine. A stacking cart generally used in one prior art is movable so that it can be moved into and out of the finisher paper collection module when loaded with paper. Current paper stacking involves the use of carts on casters for compiling paper stacks in printers. Once the carts are loaded, a manual process of unloading small stacks at a time from the main stack is needed. The finishing station is shut off while the stacked paper is being removed. Once the paper is removed, the finishing station is turned back on and the collection tray or stacker cart is replaced in the finishing collection station.

Traditional prior art stackers provide a single elevator platform which either stays in the stacker or is integrated into a cart for transport. Either way when the sheets are being removed from the system, the stacking operation is turned off. Unloading a stacker, a one-piece rigid platform or collection cart, either requires the stack to be removed from the tray or if a cart is used, the cart must be made to move into the stacker with the removal of a front lower frame support. The finisher is not running until the cart is replaced after unloading. Multiple stack trays cannot occupy the same vertical space because the tray must be raised and lowered along the same line.

Stacker designs usually provide for one stack and if multiple stacks are desired, multiple stacking locations are required. Often times this means additional stackers are required to be kept in reserve. Within stacker designs, two versions are commonly used. The first being a fixed elevator that moves up and down in a vertical space allowing for the stacking of media, the unloading of said media, and the reset of the elevator tray. As earlier noted, before the elevator can be reset, the stack must be unloaded. The time required to unload the elevator directly impacts the stacking function. Additionally, a problem known to stackers is the reset time required to move the elevator from the unload position back to the reset position. The second method commonly used in stacking is to provide the elevator function as part of a cart that can be used to unload the stacker. However, stacking cannot continue until the cart is replaced after the stack has been transported and removed. Because the cart is integral to stacking and the elevator tray is the cart, the front lower frame is removed from the stacker to allow for the cart to be moved into the stacker. This invention overcomes both of these problems without adding an additional stack or stacker module. By the use of an articulated shelf system, a rigid shelf can be formed for stacking while allowing for a flexible shelf system that can be transported out of the vertical space required by the elevator.

SUMMARY

Embodiments of this invention provide a stack support system composed of multiple paper stacking shelves for use in a finishing device. Each shelf consists of rigid segments pinned/hinged together so as to act as a rigid platform when loaded from above by a stack, but able to articulate when loaded from below. After a shelf has lowered to the unload position and its stack has been removed, it is driven out of the stacking bay by pulling the shelf segments around a radius. While this occurs, another shelf is driven manually or automatically into operative position. This approach allows for a higher system productivity by reducing 'reset' time of a prior art device having a single tray elevator and also allows a less constrained interface to any cart used during stack removal. This use of multiple re-circulating trays is new and could offer productivity advantage (true unload-while-run, with no wait for an elevator).

This invention provides a segmented stacker support/shelf system that allows for multiple stacker shelves in the same design space of prior art collection stations. As one shelf is filled, another is put in place to begin another stack. This allows for run while unload with a single stacking device. The stacker shelf is made up of two or more articulated segments that provide a rigid platform for stacking in one direction and a flexible connection in the other direction for the unloading and transport of the shelf to the reset position. Because the design does not reciprocate up and down like a conventional stacker, the need to keep the vertical design space clear for reset is not required. Because the elevator becomes flexible and resets through a different path, the invention allows for the next segmented elevator stacker support to translate down for normal stacking. The elevator support will separate at unload. If desired, this design thus allows for the insertion of a separate portable cart for unload allowing for assisted unload and eliminating the need for a dedicated cart system. The stacker frame does not need the lower front frame removed because the segmented support can unload directly onto a cart.

The stacker of the present invention could be made up of multiple shelves. Three sets of shelves are shown but more or less could be used to accomplish the stacking requirements. Each shelf could support partial or smaller stacks. At least two shelves are needed. The pivots are designed to allow flexibility in only one direction, thus providing a flexible design for reset but a rigid design for support during stacking. The first link or articulation would be connected to the drive system with a pivoting link that could have a similar function to those connecting the links to each other. The first link would be rigidly held from rotating under the load of the stack so as to provide a solid support for stacking. This support could either be part of the drive system or peripheral to it. Additionally, the links could be preloaded to allow for the shelf to be more easily formed at the reset position; for example, through the use of a torsion spring design. The paper stack support of this invention is configured to run non-stop or continuously throughout the stacking operation until the job is completed. It will stack paper without interruption as long as the user desires.

DETAILED DISCUSSION OF DRAWINGS AND PREFERRED EMBODIMENTS

Figure 1:
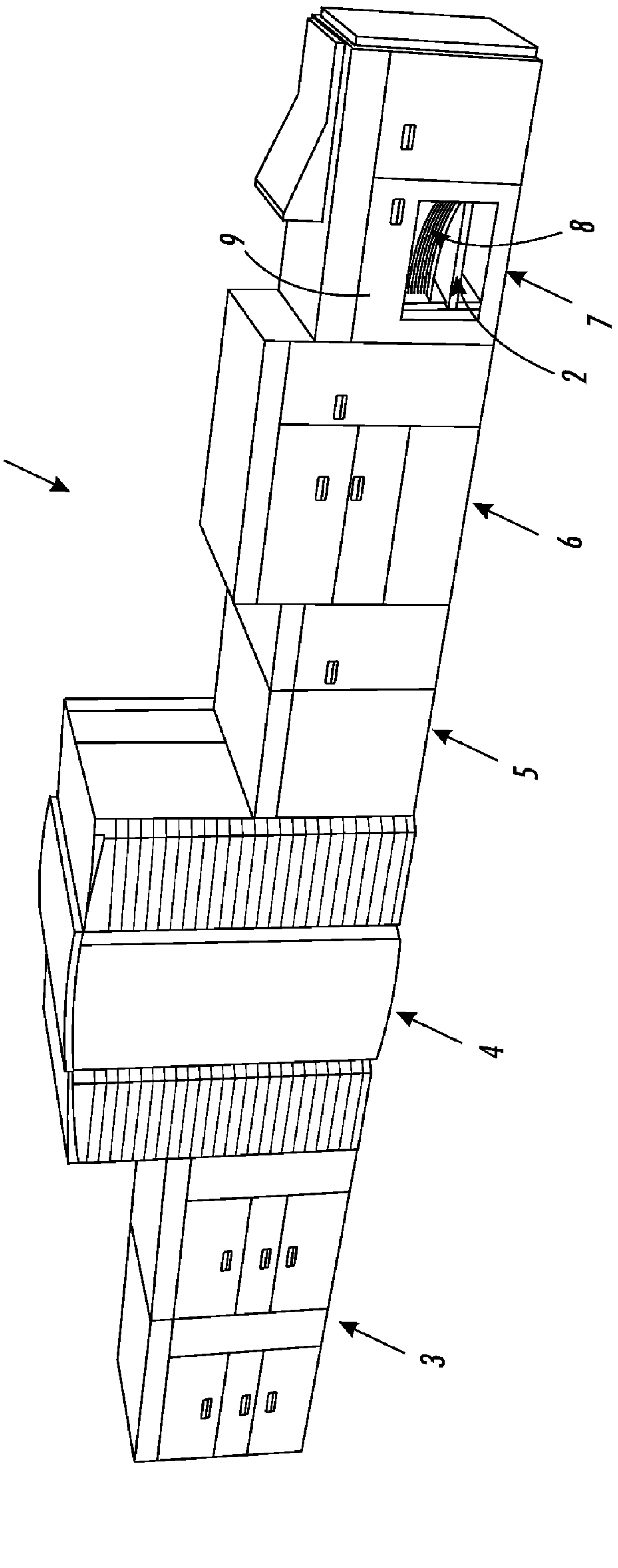
FIG. 1 illustrates a typical marking and compiler apparatus in which the finisher stackers of this invention can be used as shown in the collection station.

In FIG. 1, a typical marking-finisher system 1 is shown where the stacker support 2 of this invention can be used together with any other system where paper is stacked and subsequently removed. This marking-finisher system 1 comprises a paper feeder module 3, a printing module 4, an inverter module 5, an inserter module 6, and a finisher module 7. The finisher module 7 contains the stacker support 2 of this invention. The loading paper stack 8 supported on one shelf of the stacker support 2 of this invention can be seen through door 9. Once door 9 is opened, the loaded sliding shelf 12 of the stacker support 2 of this invention can be pulled out as like any drawer (see FIG. 5). The specifics of the stacker support 2 of this invention are not shown in FIG. 1 for clarity. These specifics are shown in FIGS. 3 and 4.

Figure 2:
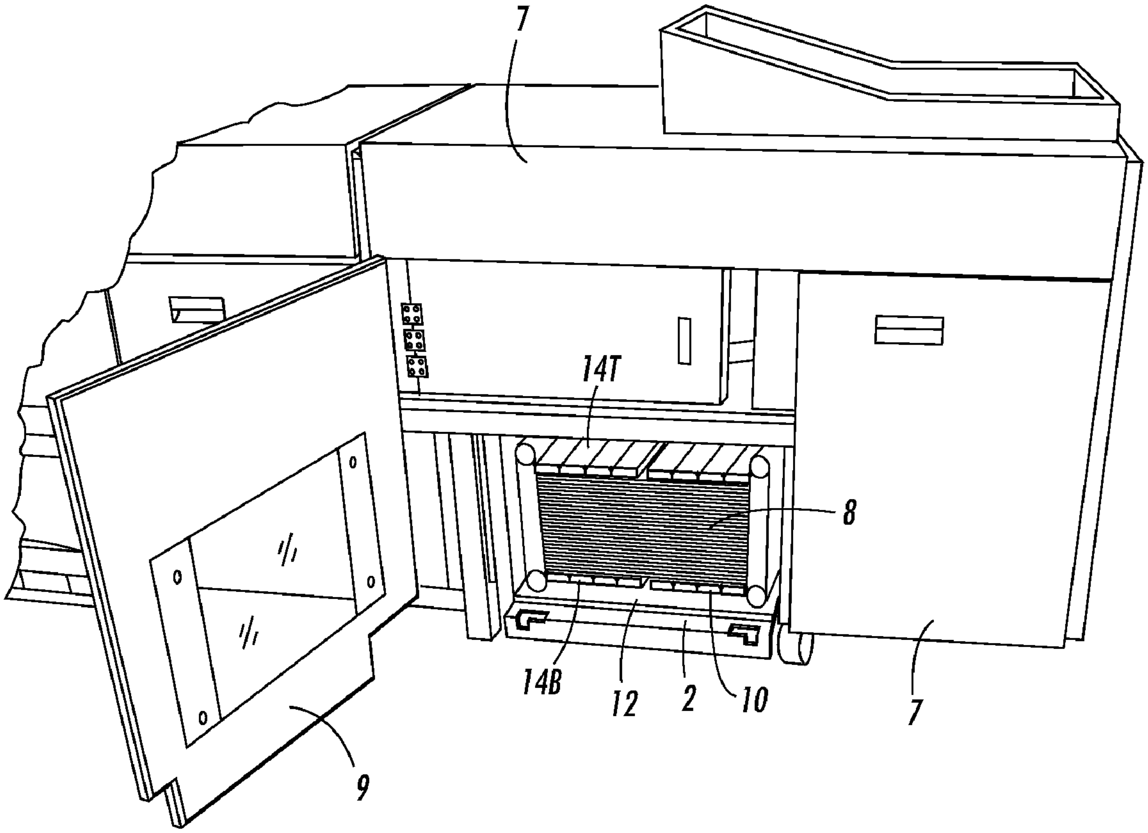
FIG. 2 illustrates the present stacker support with multiple stacking shelves as used in the collection station of a finishing device.

In FIG. 2, the stacker support 2 of this invention is shown installed in finisher module 7 with the accumulation of a paper stack 8. When door 9 is opened, as shown in this Figure in one embodiment, the stacker support 2 can be pulled out from the finisher module 7 as in FIG. 5 for unloading. The stacker support 2 can be pulled out from the finisher module 7. In FIG. 2, a stacked stacker support 2 is shown just prior to removal from finisher module 7. Shelves 14 hold the stack 8 in place while being removed. The paper stack 8 rests on sliding shelf 12 until removed to be placed upon another surface by the user. The user need not remove the stacker support 2 from the marker-finisher module 7, only pull a shelf out in one embodiment.

Figure 3:
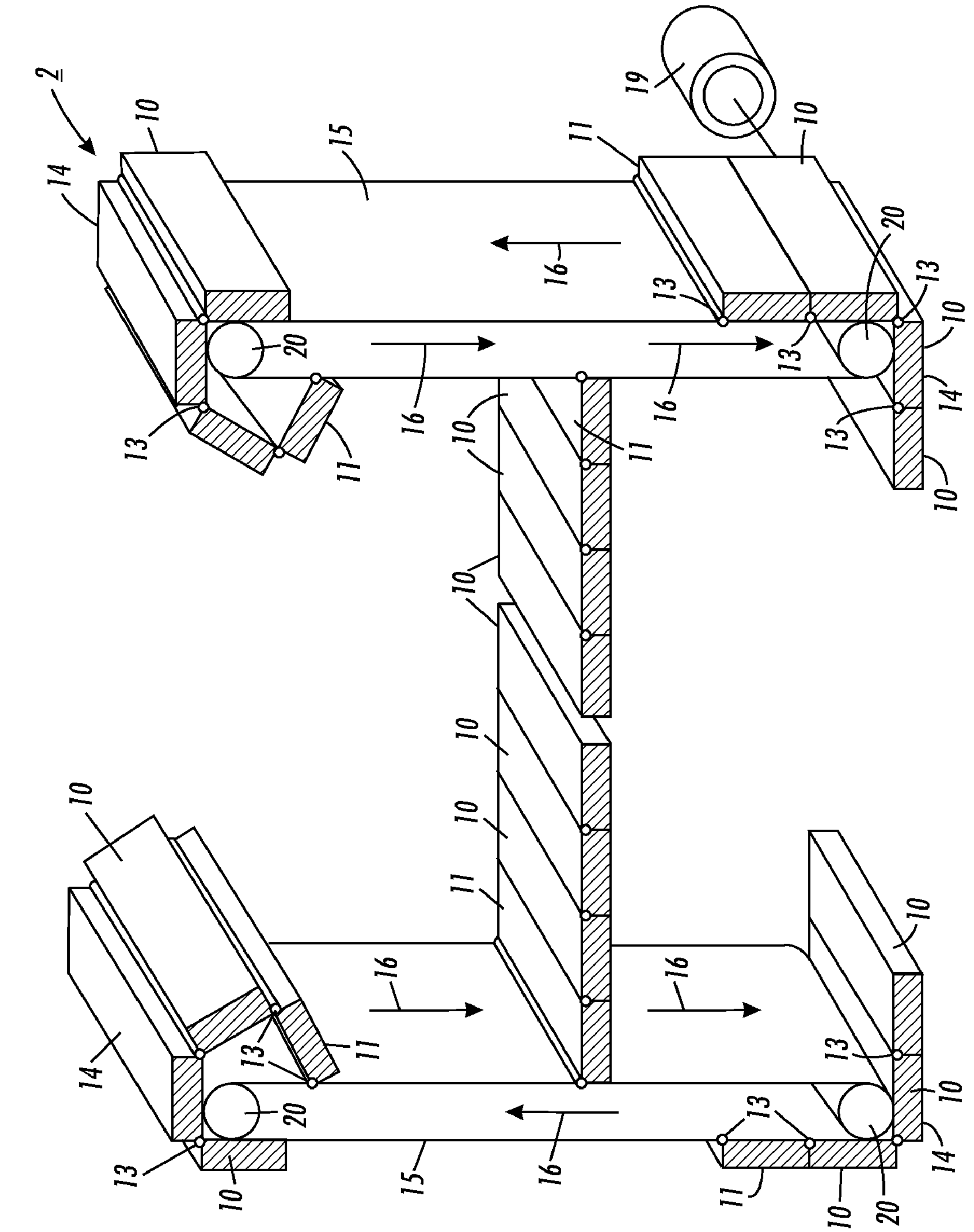
FIG. 3 is a detailed perspective view of an embodiment of an empty stacker support of this invention.

In FIG. 3 a front perspective view of the empty stacker support 2 is shown. Each shelf 14 has folding segments 10. Each segment 10 follows the leading segment 11 in an unfolding movement. Pins or hinges 13 could be spring loaded to help unfold operation, if desired. For clarity, springs are not shown in the Figures. The pin 13 configuration allows for shelf 14 stacking function as well as a flexible reset function. Three shelves 14 are shown in FIG. 3; however, any number of shelves 14 greater than two may be used. Also, each shelf 14 is shown with four segments 10; however, any suitable number of folding rigid segments 10 may be used. A belt drive system 15 is provided for moving the shelves 14 vertically in the direction of arrows 16. The bottom of FIG. 3 shows the shelf 14 being retracted for reset. The belts 15 can be moved manually or can be automatically moved via sensors 17, controller 18, and motor 19; see location of sensors 17 and controller 18 in FIG. 4. The movable belt 15 moves along rollers 20.

Figure 4:
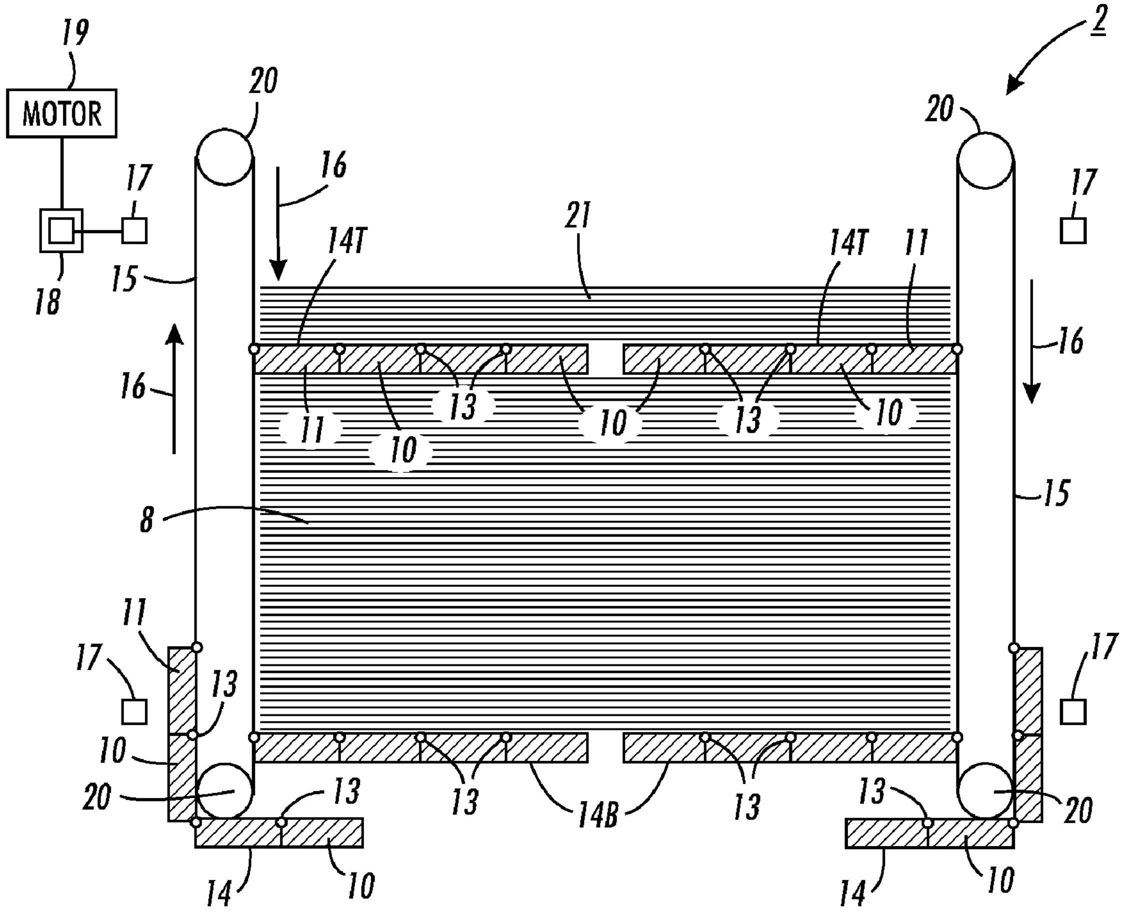
FIG. 4 is a plan view of an embodiment of the stacker support of this invention with one shelf stacked with paper, and another shelf entering the stacking area.

In FIG. 4 a plan view of a three shelf stack or stacker support 2 is illustrated having the bottom shelf 14 supporting a stack of paper or other media 8 that is ready to be unloaded from the bottom shelf 14. As the bottom shelf 14 is being unloaded, a new stack of papers 21 is entering the stacker support 2 so that you have a true unload-while-run situation without having to turn the finisher system or stacking system off. This is an important advantage of the present invention.

Figure 5:
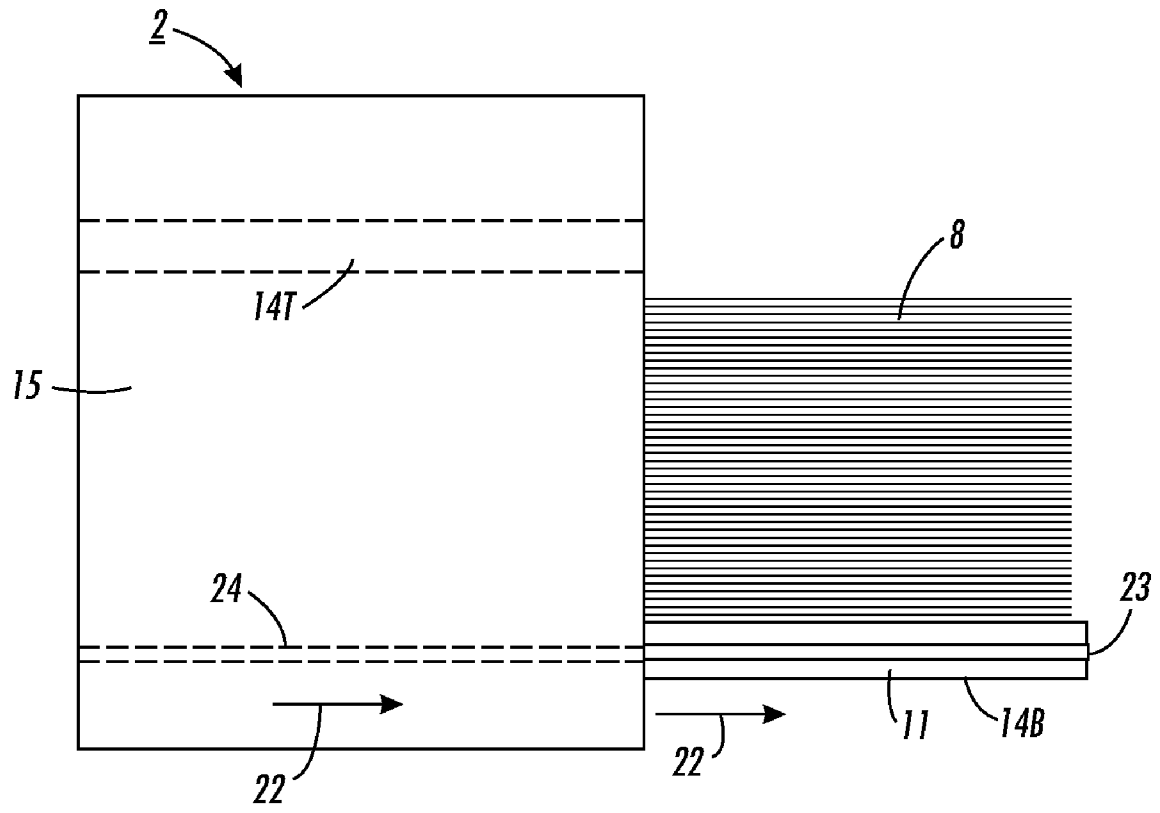
FIG. 5 is a plan view of a two-shelf embodiment of the stacker support of this invention with a fully stacked support pulled out for unloading and a new shelf moving in position for loading.

The sensors 17 can indicate when a pre-fixed weight or volume of papers is stacked on the lower stack shelf 14B and when the new upper or top shelf 14T is ready to be stacked. This information is conveyed by the sensors to the controller 18 and motor 19, which in turn moves the belt drive 15 accordingly. This automatic system is preferred; however, the belt drive 15 can be turned manually, if convenient. The shelves 14 rotate around belt 15 and rollers 20 so that at least one shelf 14 is being loaded and another shelf 14 is preparing to be loaded. By "rotating" in this disclosure and claims means the traveling of shelves 14 as shown in FIG. 4. The belt drive 15 in a preferred embodiment can have vertical structural supports (not shown) to give the shelves 14 support when loaded. For clarity, FIG. 4 shows the belt drive 15 and shelves 14 without any structural supports. In a preferred embodiment, the bottom shelf 14B when ready to be unloaded is pulled out from stacker or stack support 2 as shown in FIG. 5 and arrow 22. Bottom shelf 14B can move outwardly on sliders 23 that fit into and ride in grooves 24. Any suitable structure may be used to pull shelf 14B out for easier unloading of paper stack 8. Meanwhile, top shelf 14T is moved in place to accept a new load of paper 8. A two shelf 14 arrangement is shown in FIG. 5; however, any number of shelves 14 greater than 2 may be used, if desired. Also, while the Figures show four folding segments 10, any suitable number of segments 10 in shelves 14 may be used. In addition, any number and locations of sensors 17 may be used, depending upon the prefixed criteria desired for stack removal and other factors in the system.

In summary, this invention provides a continuously running stack support configured to support a stack of paper. This support comprises at least two stacking shelves attached to a vertically rotating belt drive.

These shelves comprise a plurality of foldable segments movably connected by pin-hinges. The shelves when loaded with a stack of paper are rigid and configured to securely support the stack of paper. The shelves when not supporting the stack of paper are movable and foldable along these pin-hinges.

The stack support is configured to have a lower shelf with a stack of papers ready to be unloaded while at substantially the same time providing an upper shelf ready to accept a new load of a paper stack. The stack support of this invention is configured to run uninterrupted or non-stop until the stacking is completed.

The belt drive is positioned to move vertically around rollers while supporting at least two movable folding shelves. The stack support wherein after a loaded stack has been moved to a lower unload position, and the stack of papers has been removed, is configured to be driven out of stack receiving position and pulled by said belt drive upwardly around a radius while another shelf is driven by the belt drive into an operative to-be-loaded position.

The stack support has such dimensions so as to be easily retrofitted into existing paper collecting stations of a finisher apparatus. The stack support is configured to have a paper stack removed from a first shelf at substantially the same time as a new paper load is being introduced into the stack support to be supported by a second shelf to provide thereby an unload-while-run paper collection system. The stack support is configured to provide a different segmented shelf to translate down in a ready-to-be loaded position at the same time as a first segmented shelf is being unloaded. The stack support can preferably be located in a collection station of an electrophotographic finishing apparatus. This stack support is configured to provide a separated stacking shelf without the necessity of unloading an already stacked shelf of the stack support. The stack support can have at least two stacking shelves and at least two foldable segments which are movable and foldable along the pin-hinges.

In an embodiment, the stack support is configured to support a stack of paper which comprises at least two stacking shelves attached to a vertically rotating belt drive. These shelves comprise a plurality of foldable segments movably connected by pin-hinges. The shelves when loaded with a stack of paper are rigid and configured to securely support a stack of paper. The shelves when not supporting the stack of paper are movable and foldable along the pin-hinges. The stack support is configured to have a lower shelf with a stack of papers ready to be unloaded while at substantially the same time providing an upper shelf is ready to accept a new load of a paper stack. The stack support is configured to run continuously until the stacking operation is completed.

This stack support wherein after a loaded stack has been moved to a lower unload position and the stack of papers has been removed, is configured to be driven out of stack receiving position and pulled by said belt drive upwardly around a radius while another shelf is driven by said belt drive into an operative to-be-loaded position.

The stack support has at least one controller, a sensor and motor electrically connected to and controlling the rotating belt drive. The lower shelf is configured, when being unloaded, to be pulled or slid away from or out from said stack support to provide thereby easy unloading of this lower shelf.

In a preferred embodiment, the belt comprises a separate support used to provide additional load support and stability to loaded stacking shelves.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A stack support configured to support a stack of paper which comprises:

at least two stacking shelves attached to two vertically rotating belt drives, the two vertically rotating belt drives located on opposite sides of the stack support, said at least two shelves each comprising a plurality of foldable segments, at least two of the plurality of foldable segments located on opposite sides of the stack support movably connected by pin-hinges, said shelves when loaded with a stack of paper being rigid and configured to securely support said stack of paper and moveable in a downward direction, said shelves when not supporting said stack of paper being movable along a path of said belt drives in an upward direction on an opposite side of each belt drive from the shelves being moved in a downward direction and foldable along said pin-hinges, said stack support configured to provide a lower shelf with a stack of papers ready to be unloaded while at substantially the same time providing an upper shelf ready to accept a new load of a paper stack, said lower shelf configured to be slid away from said stack support to provide thereby easy unloading of said lower shelf, said stack support configured to continuously stack paper throughout a stacking operation, wherein a sensor indicates when a pre-fixed volume of paper is stacked on said lower shelf and when said upper shelf is ready to accept a new load of a paper stack.

2. The stack support of claim 1 wherein said belt drive is positioned to move vertically around rollers while supporting at least two movable folding shelves.

3. The stack support of claim 1 wherein after a shelf with a loaded stack has been moved to a lower unload position and said stack of paper has been removed, said shelf is configured to be driven out of stack receiving position and pulled by said belt drive upwardly around a radius, while another shelf is driven by said belt drive into an operative to-be-loaded position.

4. The stack support of claim 1 having such dimensions so as to be easily retrofitted into existing paper collecting stations of a finisher apparatus.

5. The stack support of claim 1 that is configured to have a paper stack removed from a first shelf at substantially the same time as a new paper load is being introduced into the stack support to be supported by a second shelf, to provide thereby an unload-while-run paper collection system.

6. The stack support of claim 1 configured to provide a different segmented shelf to translate down in a ready-to-be loaded position at the same time as a first segmented shelf is being unloaded or readied to be unloaded.

7. The stack support of claim 1 as it is located in a collection station of an electrophotographic finishing apparatus.

8. The stack support of claim 1 configured to provide a separated stacking shelf without the necessity of unloading an already stacked shelf of said stack support.

9. The stack support of claim 1 having at least two stacking shelves and at least two foldable segments, said segments movable and foldable along said pin-hinges.

10. A stack support configured to support a stack of paper which comprises:

at least two stacking shelves attached to two vertically rotating belt drives, the two vertically rotating belt drives located on opposite sides of the stack support, said at least two shelves each comprising a plurality of foldable segments, at least two of the plurality of foldable segments located on opposite sides of the stack support movably connected by pin-hinges, said shelves when loaded with a stack of paper being rigid and configured to securely support said stack of paper and moveable in a downward direction, said shelves when not supporting said stack of paper being movable and foldable along said pin-hinges along a path of said belt drives in an upward direction on an opposite side of each belt drive from the shelves being moved in a downward direction, said stack support configured to provide a lower shelf with a stack of papers ready to be unloaded while at substantially the same time providing an upper self ready to accept a new load of a paper stack, said stack support having at least one controller, sensor and motor electrically connected to and controlling said rotating belt drive, said lower shelf configured to be slid away from said stack support to provide thereby easy unloading of said lower shelf, said stack support configured to stack paper continuously until an end of a stacking operation, wherein a sensor indicates when a pre-fixed volume of paper is stacked on said lower shelf and when said upper shelf is ready to accept a new load of a paper stack.

11. The stack support of claim 10 wherein said belt drive is positioned to move vertically around rollers while supporting at least two movable folding shelves.

12. The stack support of claim 10 wherein after a loaded stack has been moved to a lower unload position and said stack of papers has been removed, it is configured to drive out of stack-receiving position and pulled by said belt drive upwardly around a radius, while another shelf is driven by said belt drive into an operative to-be loaded position.

13. The stack support of claim 10 having such dimensions so as to be easily retrofitted into existing paper collecting stations of a finisher apparatus.

14. The stack support of claim 10 that is configured to have a paper stack removed from a first shelf at substantially the same time as a new paper load is being introduced into the stack support to be supported by a second shelf, to provide thereby an unload-while-run paper collection system.

15. The stack support of claim 10 configured to provide a different segmented shelf to translate down in a ready-to-be loaded position at the same time as a first segmented shelf is being unloaded.

16. The stack support of claim 10 as it is located in a collection station of an electrophotographic finishing apparatus.

17. The stack support of claim 15 as it is located in a collection station of an electrophotographic finishing apparatus.

18. The stack support of claim 10 having at least two stacking shelves and at least two foldable segments, said segments movable and foldable along said pin-hinges.

19. The stack support of claim 10 wherein said belt comprises a separate shelf support, said support configured to provide additional load stability to said stacking shelves when loaded.

* * * * *